United States Patent [19]

Humiston

[11] 4,324,983
[45] Apr. 13, 1982

[54] BINARY VAPOR CYCLE METHOD OF ELECTRICAL POWER GENERATION

[76] Inventor: Gerald F. Humiston, Apartment E 202, 2909 Gulf to Bay Blvd., Clearwater, Fla. 33519

[21] Appl. No.: 833,663

[22] Filed: Sep. 15, 1977

[51] Int. Cl.³ .............................................. F01K 25/06
[52] U.S. Cl. .................................... 290/1 R; 60/641.6
[58] Field of Search ...................... 60/641, 398; 290/1, 290/52; 62/335, 324 D, 238 E

[56] References Cited
U.S. PATENT DOCUMENTS

3,984,050 10/1976 Gustafsson ........................... 237/213

*Primary Examiner*—Gene Z. Rubinson
*Assistant Examiner*—W. E. Duncanson, Jr.
*Attorney, Agent, or Firm*—Frijouf, Rust & Pyle

[57] ABSTRACT

A binary vapor cycle method of electrical power generation is disclosed wherein two refrigerant fluids can be used to operate an apparatus for the generation of mechanical power as well as electrical power generation. This method, which is essentially a dual heat pump system, offers an approach to utilizing the advantages of two different refrigerants within a single apparatus. This advantage is particularly advantageous in the ulitization of low specific energy sources, such as two water sources which exist in close proximity to each other, but at different temperatures. Thus, water, which itself is a heat pump fluid, can be used as a means of transmitting heat energy to a second heat pump fluid, or refrigerant, without incurring the disadvantages of water, or water vapors, as a means to produce power, because of its high specific volume and low saturation pressures at low temperatures. Additionally, since the warm water source of energy most commonly available is in the form of reservoirs, such as the ocean waters, and the utilization of barometric legs to bring the warm water into contact with the process, eliminates the use of expensive heat exchangers, which is the case of ocean water, are subject to fouling and loss of efficiency due to clinging microorganisms.

12 Claims, 3 Drawing Figures

BINARY VAPOR CYCLE METHOD OF ELECTRICAL POWER GENERATION

CROSS-REFERENCE TO RELATED APPLICATIONS

This application is related to my corresponding patent application entitled Method Of Electrical Power Generation filed concurrently herewith. This corresponding application is hereby incorporated by reference into the instant application.

BACKGROUND OF THE INVENTION

1. Field of the Invention

This invention relates to a binary vapor cycle method of electrical power generation and production of mechanical power which is applicable to the utilization of low specific energy sources, such as two water sources which exist in close proximity to each other, but at different temperatures. This method is essentially a dual heat pump system in which the heat pump fluid of the first heat pump system is the water, or other fluid, of the warm fluid source, and the heat pump fluid of the second heat pump system can be a refrigerant that has properties that include high changes in saturation pressure with small changes in temperature. Thus, water from the warm water source, which in itself is a heat pump fluid, can be used as a means of transmitting heat energy to the second heat pump, without incurring the disadvantages of water as a refrigerant to produce power, because of its high specific volume and low saturation pressures, negative, at low temperatures. Additionally, since the warm water source of energy most commonly available is contained in the form of reservoirs, such as the ocean waters, barometric legs can be used to bring the warm water source into thermal contact with the process, eliminating the use of expensive heat exchangers, which in the case of ocean water, are subject to fouling and loss of efficiency due to clinging microorganisms.

The process and apparatus hereinafter described is, for clarity, specifically a description of the use of the process and apparatus with a warm water source and a cold water source, such as the ocean waters, it being understood that the principles described here are pertinent to any such applications where sufficient fluid temperature differentials exist.

2. Description of the Prior Art

As the worlds sources of fossilized fuels are rapidly depleting, the alternate sources of power under strict scrutiny include the so-called natural energies, such as solar power, indirect solar power, geo-thermal power, etc. One of the many faceted solutions to the development of new sources of energy appears to lie in the utilization of the energy differentials existing between two fluid sources at different temperatures, such as are present in tropical ocean waters, wherein the warm surface waters, which are solar heated, are at temperatures considerably higher than the cold deep oceans waters.

Although the total energy existing in two large fluid sources at different temperatures, such as exist in ocean waters, is enormous, the specific energy, the energy existing per unit of weight or mass is very small indeed, necessitating new and novel techniques and cycles to utilize the small amount of specific energy available to do productive work.

The heat pump has been known as one of the most efficient method for heating and cooling with the application of small amounts of external energy. Application of heat pump principles appear to offer the solutions for obtaining usable energy from the aforementioned low specific energy sources. Previously, heat pump systems have been designed to obtain the maximum amount of heat transfer from one source to another source with the minimum amount of power applied. To utilize heat sources of low specific energy for the production of energy, it is now necessary to devise heat pump systems that will produce the maximum amount of energy with the minimum amount of heat energy applied.

Therefore it is an object of this invention to provide a process and an apparatus which overcomes the aforementioned inadequacies of the prior art devices and provides an improvement which is a significant contribution to the advancement of the pertinent art.

Accordingly, it is an object of the present invention to provide a novel and improved heat pump system which is operable to produce mechanical power and/or electrical power using a warm fluid source for supplying heat to offset the heat loss which occurs during vaporization of a fluid and a cold source to effect condensing of the fluid vapors.

It is also an object of the present invention to provide a process and an apparatus whereby a first heat pump system derives heat energy of a warm water source and delivers said heat energy to the evaporator of a second heat pump system, the heat exchanger means of the evaporator of the second heat pump system being the condensing means of the first heat pump system.

It is also an object of the present invention to provide a process and an apparatus wherein the first heat pump system becomes the warm source, or energy source, for a second heat pump system wherein mechanical power and electrical power are produced.

It is another object of the present invention to provide a process and an apparatus wherein the second heat pump into which a prime mover has been interposed which is driven by the pressure difference between an evaporator section of the apparatus, which contains a refrigerant and is at the saturation pressure of the refrigerant for the corresponding temperature of the refrigerant, which is heated by the first heat pump, and the lower saturation pressure of the cooler refrigerant in the condenser section of the apparatus, which is cooled by the cold fluid source, and the mass flow of refrigerant vapors between the evaporator and the condenser sections of the apparatus.

It is a further object of the present invention to provide a means of converting all or part of the output of said prime mover means to electrical energy by means of an electrical generator means and an electrical control means.

It is still another object of the present invention to provide a controlled means, within the second heat pump system, of returning the condensed refrigerant, liquid, from the condenser means to the evaporator means to replace the said refrigerant evaporated in the said evaporator means.

A further object of the present invention is to provide a means, within the second heat pump, of controlling the speed of the prime mover means regardless of variations in the load on the generator means, by means of a control valve means and conduit means in parallel with the prime mover means which is capable of by-passing a portion of the flow of refrigerant vapors from the evaporator means to the condenser means, thereby controlling the pressure across the prime mover means.

Yet another object of the present invention is to provide a heat exchanger means and a pump means to bring the refrigerant in the evaporator means, of the second heat pump system, into thermal contact with the water vapors in the condenser means of the first heat pump system. The heat of condensation of the vapors in the condenser means of the first heat pump in thermal contact with the said heat exchanger provides the means by which the heat of vaporization lost in the evaporator of the second heat pump is constantly being replaced.

Still another object of the present invention is to provide a heat exchanger means within the condenser means of the second heat pump system, wherein the refrigerant vapors of the second heat pump system within the condenser means are brought into thermal contact with the cooling, or condensing, water, removing the heat of condensation, which is equal to the heat of vaporization.

Another object of the present invention is to provide a means of removing condensate water from the condenser means of the first heat pump system by means of a barometric conduit, or alternatively, removing said condensate water by conventional pump and conduit means, or alternatively, returning the said condensate water to the water source by means of a barometric conduit.

It is still another object of the present invention to provide, within the first heat pump system, a process and an apparatus which is capable of operating, by means of a vacuum pump means, at the temperature of the warm water source, not requiring any addition of conventional energy.

Another object of the present invention is to provide, within the second heat pump system, a prime mover of the positive displacement type with the lowest possible volumetric efficiency in order to derive the maximum power from the existing and available pressure differentials while requiring the least possible mass flow of refrigerant vapors and subsequently requiring the least energy from the water, or fluid, sources.

Other objects and a fuller understanding of this invention may be had by referring to the summary of the invention, the description and the claims, taken in conjunction with the accompanying drawings.

SUMMARY OF THE INVENTION

It has now been found that the foregoing and related objects can be readily attained in the novel and improved heat pump processes and apparatus, hereinafter described, for the production of mechanical power and the generation of electrical power, using fluid sources of low specific energy, but at different temperatures, as the means of powering the said process and apparatus. Although these two fluid sources could be oil, natural gas, atmospheric air, waste streams salt water, fresh water, or any other two fluids in which energy differentials exist as a function of their different temperatures; we shall, for simplicity, refer to the two fluids as a warm water source and a cold water source.

The subject method can be divided into two separate heat pump systems, each performing a separate and distinct function. The first heat pump system is located between the warm water source and the second heat pump and uses the warm water source as the fluid of the heat pump system. The second heat pump system uses a conventional refrigerant such as ammonia, freon, water, carbon dioxide, carrene, or any other suitable refrigerant, and uses the first heat pump as a warm source and the cold water source as a cooling, or condensing source. The second heat pump means being the heat pump process and apparatus that generates the power of the process. Thus, this method, which is essentially a dual heat pump system, offers an approach to utilizing the advantages of two different refrigerants within a general apparatus. This advantage is particularly advantageous in the utilization of low specific energy sources, such as two water sources which exist in close proximity to each other, but at different temperatures. Thus, water, which itself is a heat pump fluid, can be used in a first heat pump means to transmit heat energy to a second heat pump, wherein the refrigerant is more suitable to the production of power by means of high saturation pressures at lower temperatures, without incurring the disadvantages of water, or water vapors, as a means to produce power, because of its high specific volume and low saturation pressures at low temperatures. Additionally, since the warm water sources of energy most commonly available are in the form of reservoirs, such as the oceans waters, and the utilization of barometric conduits to bring the warm water source into contact with the process, eliminating the need for expensive heat exchangers, which is the case of ocean water, are subject to fouling and loss of efficiency due to clinging microorganisms.

First let us describe the first heat pump system, which can be used with the second heat pump system described herein, or with any other heat pump system, or in any other manner and with any other apparatus, wherein it is advantageous to use the condenser means of the said heat pump as a heat source for a further process. This heat pump system comprises an evaporating means and a condensing means. A warm water source. Conduit means for connecting the said evaporator means to the said condenser means. A barometric conduit means connecting the said evaporator means with the warm water source, such as warm surface ocean water, of such height as to form a barometric leg into which the water will only rise to the desired height when the evaporator is at the negative pressure of the process. The said condenser means contains a heat exchanger means which is connected to the second heat pump, or such other process or apparatus into which the energy of this first heat pump system is to be pumped. A vacuum pump means whereby the negative pressure of the apparatus is established. This negative pressure being the saturation pressure of the water of the warm water source at the temperature of the warm water source in the said evaporator. A barometric conduit means connecting the said condenser means to the water source to return the condensed vapors, liquid, in the said condenser means to the water source, or alternatively, when the condensed vapors from the said condenser means are desired to be taken from the process, since they are essentially distilled, or desalinated, water, a barometric conduit means and a valve means permit the removal of the condensed vapors, liquid, from the negative pressure of the apparatus. This removal of condensed vapors, liquid, from the said condenser means can also be accomplished by conventional pump means and conduit means. A circulating pump means and conduit means located in the said barometric conduit means connecting the said evaporator means to the warm water source. Said circulating pump means draws warm water from the warm water source through one of the said conduit means and discharges this flow, through the other said conduit means, upwardly in the said barometric conduit means to induce and assist the thermal circulation in the said barometric conduit means. Thus, a heat pump system has been established comprising a closed apparatus with a warm water source and a condensing means, a method of bringing the warm water of the warm water source into contact with the said evaporator means, a method of removing condensed vapors, liquid, from the apparatus, and a means of initially establishing the negative, or saturation pressure, has been described.

A fundamental characteristic of this first heat pump system, of which this invention is a novel variation, comprises a closed loop system established between an evaporator means, where warm water is subjected to the conditions for evaporation and the water vapors leave the water, carrying with them the heat of varporization; and a condenser means, wherein the water vapors are condensed, thereby liberating the heat of condensation, which is equal to the heat of vaporization. In the case of this first heat pump, of the subject invention, the heat to the evaporator means is furnished by a warm water source, and the cooling, or condensing, means for the said condenser means is a subsequent process or apparatus attempting to withdraw heat energy from the said condenser means. The process and apparatus operates at the saturation pressures dictated by the various temperatures in the apparatus. The condensed water vapors collected in the said condenser means may be returned to the water source, or removed from the apparatus for external usage, since these condensed vapors, liquid, are essentially distilled, or desalinated, water. A vacuum pump means establishes the initial negative, or saturation, pressure of the apparatus and during operation removes any non-condensable vapors or gases.

The second heat pump system of the instant invention comprises a closed heat pump system containing a refrigerant such as ammonia, freon, water, carbon dioxide, carrene, or any other suitable refrigerant and consists of an evaporator means and a condenser means. Conduit means connecting the said evaporator means to the said condenser means. Heat exchanger means and pump means to bring the said refrigerant in the said evaporator means into thermal contact with the condenser means of the first heat pump means. Heat exchanger means within the said condenser means and a pump means to bring the refrigerant vapors in the said condenser means into thermal contact with the cold water source. A pump means and conduit means to return the condensed refrigerant, liquid, back into the said evaporator means. A liquid level control means within the said evaporator means and a divert valve means whereby the level of the said refrigerant in the said evaporator means can be maintained by means of the liquid level control means controlling the said divert valve means, allowing the condensed refrigerant to flow from the said condenser means to the said evaporator means when the level of the refrigerant in the said evaporator is less than the desired level and diverting the flow of the said condensed refrigerant back into the said condenser means when the refrigerant level in the said evaporator means is satisfactory. A prime mover means interposed into the said conduit means connecting the said evaporator means to the said condenser means. An electrical generator means coupled to the said prime mover means to convert all or part of the power developed in the said prime mover means to electrical power. An electrical control means connected to the said electrical generator means to direct the electrical power from the said electrical generator means to the elements of the apparatus which require electrical power, and further, to direct excess electrical power for external usage. A controllable valve means and conduit means, in parallel with the prime mover means, whereby the refrigerant vapor flow, and subseqeunt pressure, can by-pass the said prime mover means as a means to control the speed of the said prime mover means compensating for variations in loads on the said electrical generator means.

A fundamental characteristic of this second heat pump system, of which this invention is a novel variation and which is similar in most respects to the subject matter claimed in my copending patent application, which is entitled Method of Electrical Power Generation, comprises a closed loop system established between an evaporator means, where a refrigerant is subjected to the conditions for evaporation and the refrigerant vapors leave the liquid refrigerant, carrying with them the heat of vaporization, and a condenser means wherein the refrigerant vapors are condensed, thereby liberating the heat of condensation, which is equal to the heat of vaporization. In the case of the subject invention, the heat to the said evaporator means is furnished by the first heat pump means, and the cooling, or condensing, means in the condenser means is furnished by the cold water source, the process operating at the saturation pressures for the refrigerant used, dictated by the various temperatures in the apparatus. The prime mover means interposed into the closed loop provides mechanical power as well as power to drive an electrical generator means. An electrical control means directs electrical power to the elements of the apparatus, and further, directs excess electrical power for external usage. A pump means, conduit means, divert valve means and a liquid level control means return the condensed refrigerant, liquid, to the said evaporator means in a controlled manner. The speed of the said prime mover means is controlled by a controllable valve means and conduit means in parallel with the said prime mover means.

The power developed by the said prime mover means is a function of the pressure differential across the said prime mover means. Said pressure differential is the difference between the saturation pressure of the said refrigerant in the said evaporator means, which is heated by the first heat pump system, energy which is indirectly from the warm water source, and the saturation pressure of the said refrigerant in the said condenser means, which is cooled by the cold water source. Since the prime mover is of the positive displacement type, the amount of refrigerant vapors passing through the said prime movers means is a function of its volumetric efficiency, and therefore, it is desirable to use a positive displacement prime mover with the lowest possible volumetric efficiency in order to require the least flow of refrigerant vapors from the said evaporator means to the said condenser means, and therefore, obtain the maximum amount of generated power for the amount of heat available from the first heat pump system and the cooling effects from the cold water source.

The practice of the instant invention enables an apparatus capable of producing mechanical power and electrical power generation using water sources, or other fluid sources, of low specific energy, by means of a dual heat pump system, more accurately described as a Binary Vapor Cycle.

This invention accordingly comprises a process and an apparatus possessing the features, properties and the relationship of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE DRAWINGS

Figure 1:
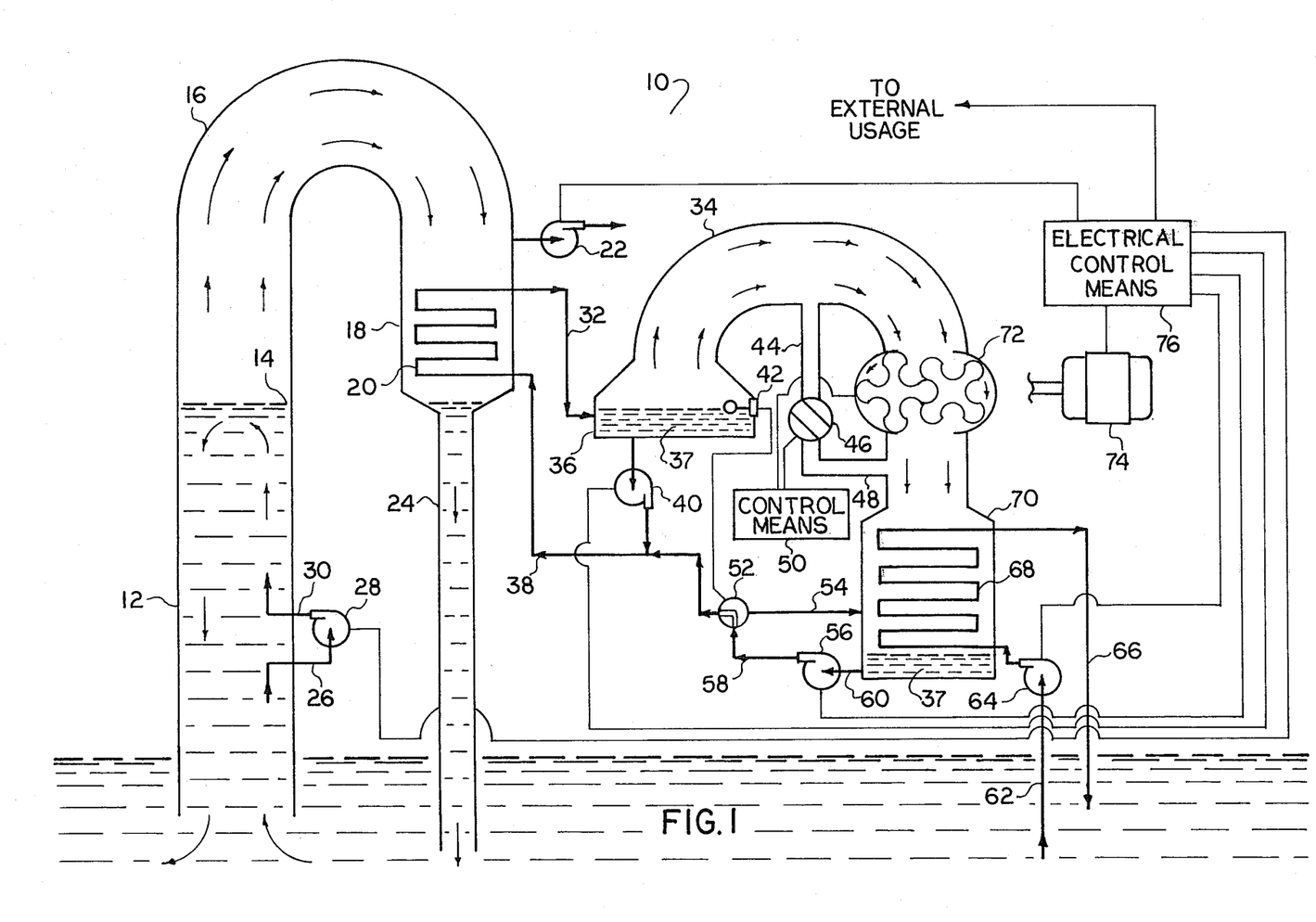
FIG. 1 is a diagram of a first heat pump system and a second heat pump system embodying the instant invention, with the means of returning the condensate water of the first heat pump system being a barometric conduit to the water source.

Referring now to FIG. 1, therein illustrated is one embodiment of an apparatus comprising two heat pump systems, in which the first heat pump system is the means by which the heat energy from a warm water source is used to supply the heat energy to a second heat pump means, which is the means of producing mechanical and electrical power sufficient to sustain the operation of the first and second heat pump systems, and additionally, provide excess power for external usage, from two fluid sources at different energy levels as a result of their being at different temperatures. A distinguishing feature of this invention is that the apparatus herein described and illustrated uses two heat pump systems connected in series to form a binary vapor cycle system in which the warm water, or warm fluid, source is the heat pump fluid, or refrigerant, and a conventional refrigerant is used in the second, or power producing, heat pump system. This second heat pump system contains a positive displacement type of prime mover which derives its power from the pressure difference across the prime mover and being of low volumetric efficiency, displaces a minimum of refrigerant vapors. Since this is basically an adiabatic throttling process, extremely low temperature differences between the evaporator and the condenser can be used to produce significant power as opposed to a turbine type of prime mover which would require large changes in enthalpy to obtain significant power. Thus, the apparatus herein described and illustrated can use two water, or fluid, sources at temperature differences, which have heretofore been considered insignificant, to supply the energy necessary to power the apparatus, and additionally, to supply excess energy for external usage.

The major components of the first heat pump system of the apparatus 10, illustrated in FIG. 1, include an evaporator designated by the numeral 14. The evaporator 14 is connected to a condenser designated by the numeral 18 by a conduit designated by the numeral 16.

A barometric conduit designated by the numeral 12 connects the evaporator 14 to the warm water source. The barometric conduit 12 is of such height that the water from the warm water source will only rise to the desired level when the apparatus 10 is at the saturation pressure, negative, of the water in the evaporator 14. A barometric conduit designated by the numeral 24 connects the condenser 18 with the water source. The height of the barometric conduit 24 is sufficient to allow water from the water source to only rise to the desired height when the condenser 18 is at the saturation pressure, negative, of the water in the condenser 18. A vacuum pump designated by the numeral 22 establishes the initial saturation pressure in the said apparatus 10 and thereafter removes non-condensable vapors and gases from the apparatus 10 during operation. A pump 28 designated by the numeral 28 draws in water from the warm water source through a conduit designated by the numeral 26 and discharges this flow through conduit 30, upwardly in the barometric conduit 12 to induce and assist thermal circulation of the warm water source in the barometric conduit 12.

With further reference to FIG. 1, a specific example of the first heat pump system is illustrated, wherein the warm water source is specifically the warm ocean surface water and the cooling, or condensing means in the condenser is the heat exchanger coupled to the second heat pump system. The process is instituted initially by the vacuum pump 22 evacuating the air from the closed system. The vacuum pump 22 reduces the pressure in the closed system until the pressure in the system reaches the saturation pressure dictated by the temperature of the warm ocean surface water. In the case of ocean surface water at 80° F., the pressure left in the apparatus 10 would be the saturation pressure of water at 80° F. or approximately 0.507 psia. With the continued operation of the vacuum pump 22, the closed system then fills with water vapor at the saturation temperature and pressure of 80° F. and 0.507 psia.

Because of the difference in the pressure in the closed first heat pump system and the pressure of the atmospheric air surrounding the closed system, the ocean water in conduit 12 and conduit 24 rises until the ocean water in the conduits has created a head pressure at the ocean surface equal to the atmospheric pressure. In the case of atmospheric pressure at 14.7 psia, the difference in pressure between the inside of the closed system and the atmospheric pressure outside of the closed system would be approximately 14.193 psi and would therefore cause the ocean water in conduit 12 and conduit 24 to rise approximately 31.8 feet above the surface of the ocean.

A heat exchanger designated by the numeral 20, coupled to the second heat pump system, is the cooling, or condensing, means for the water vapors in the condenser 18. When water vapors in the condenser 18 come into thermal contact with the colder heat exchanger 20, they are condensed, thereby liberating the heat of condensation, said heat of condensation providing the heat means to the second heat pump system. The condensed vapors, liquid are returned to the ocean by means of the barometric conduit 24. As the water vapors are condensed in the condenser 18 there is a considerable reduction in volume as the vapors become liquid, thereby drawing additional vapors from the evaporator 14, establishing a flow of water vapors from the evaporator 14 to the condenser 18. Heat for continued evaporation in the evaporator 14 is provided by thermal circulation of the warm surface ocean water in conduit 12. This thermal circulation is induced and assisted by the pump 28, which draws warm ocean surface water through conduit 26 and discharges this flow through conduit 30, upwardly in the barometric conduit 12, thus establishing a non-random thermal circulation. The heat of vaporization lost to the vapors evaporated in the evaporator 14 are thus constantly replaced.

Since the vapors caused by evaporation in the evaporator 14 are pure water vapors and do not contain the salts or minerals present in the ocean water and since the evaporator 14 is separated from the condenser 18 by a vapor conduit 16, the condensate water obtained as a result of the condensation of the vapors in the condenser 18 is distilled, or desalinated, water. The heat exchanger 20, which is the heat source for the second heat pump system, is thus not exposed to scaling or clinging microorganisms as would be the case if the heat exchanger 20 were to be brought into direct contact with the ocean water.

Again with reference to FIG. 1, a specific example of the second heat pump system is illustrated, wherein the warm, or energy source, is the first heat pump system and the cooling, or condensing, source is cold deep ocean water pumped from deep beneath the ocean surface. The major components of the second heat pump system of the apparatus 10, illustrated in FIG. 1, include an evaporator designated by the numeral 36. The evaporator 36 functions as a reservoir for the refrigerant generally designated by the numeral 37. The pump designated by the numeral 40 draws the refrigerant 37 from the evaporator 36 and by means of a conduit designated by the numeral 38 pumps the refrigerant 37 into the heat exchanger designated by the numeral 20 and then returns the said refrigerant 37 to the evaporator 36 through a conduit designated by the numeral 32, thus, bringing the refrigerant 37 into thermal contact with the condenser 18 of the first heat pump system. A condenser designated by the numeral 70 contains therein a heat exchanger designated by the numeral 68. A pump designated by the numeral 64 draws in cold, or condensing, water, in this case, deep ocean water, through a conduit designated by the numeral 62 and pumps the said deep cold ocean water through the heat exchanger 68. The cold, or condensing, water is subsequently returned to the ocean by means of a conduit designated by the numeral 66. A means has thus been established to bring the cold deep ocean water into thermal contact with the refrigerant vapors within the condenser 70. A conduit designated by the numeral 34 connects the evaporator 36 and the condenser 70. A prime mover of the positive displacement type designated by the numeral 72 is interposed into the conduit 34. An electrical generator designated by the numeral 74 is coupled to the prime mover 72 to convert all or part of the power developed in the prime mover 72 into electrical power. An electrical control designated by the numeral 76 directs the electrical power produced by the electrical generator 74 to the elements of the apparatus which require electrical power, and further, directs excess electrical energy for external usage. A conduit designated by the numeral 44, a conduit designated by the numeral 48 and a controllable valve designated by the numeral 46, placed in parallel with the prime mover 72, controls the speed of the prime mover 72 to a constant valve by the capability of by-passing the flow of refrigerant vapors around the prime mover 72, thus compensating for variations in loads on the electrical generator 74. A control means designated by the numeral 50 senses the speed of the prime mover 72 and modulates the controllable valve 46. A pump designated by the numeral 56 draws condensed refrigerant vapors 37, liquid, from the condenser 70 through a conduit designated by the numeral 60 and pumps the said refrigerant 37 through a conduit designated by the numeral 58 to a divert valve designated by the numeral 52. A liquid level control designated by the numeral 42 is located in the evaporator 36. The liquid level control 42 maintains the desired level of refrigerant 37 in the evaporator 36 by controlling the divert valve 52, allowing the refrigerant 37 to flow into the evaporator 36 by means of conduit 38 when the level of the refrigerant 37 in the evaporator 36 is less than the desired level, and diverting the flow of the said refrigerant 37 back into the condenser 70 when the level of the refrigerant 37 in the evaporator 36 is satisfactory by means of a conduit designated by the numeral 54.

The second heat pump system, illustrated wherein the hot, or energy source is the first heat pump means and the cold, or condensing, source is cold deep ocean water, functions as follows. The closed second heat pump system is initially evacuated of air and gas and charged with the refrigerant 37 to be used, let us say for the purposes of this example, ammonia. The refrigerant 37 exists as a liquid to the level in the system to which it is filled and the balance of the system is then filled with the vapors of the refrigerant 37 at the saturation pressure for ammonia corresponding to the temperature of the system. For example, if the system was 80° F., the pressure in the system would be the saturation pressure of ammonia at 80° F., or 153 psia. Operation of the system is then instituted by means of auxiliary power equipment, since no electrical power exists at the electrical control 76. Cooling water, cold deep ocean water, is then pumped through the heat exchanger 68 within the condenser 70 by the pump 64 which draws in cold deep ocean water through conduit 62 and pumps the same to the heat exchanger 68. After passing through the heat exchanger 68, the condensing water is returned to the ocean by means of conduit 66. Pump 40 draws refrigerant 37 from the evaporator 36 and by means of conduit 38, pumps the refrigerant 37 to the heat exchanger 20, and subsequently the refrigerant 37 is returned to the evaporator 36 by means of conduit 32. Since the heat exchanger 20 is in the condenser 18 of the first heat pump system, the refrigerant 37 is thus brought into effective thermal contact with a heating source, in this case, the condensing water vapors of the first heat pump system, which liberate the heat of condensation of the vapors to the heat exchanger 20. The saturation pressure in the evaporator 36 then becomes the saturation pressure of the refrigerant 37 corresponding to the temperature to which it is being heated by the first heat pump system, and the saturation pressure in the condenser 70 is then the saturation pressure for the refrigerant 37 in the condenser 70, corresponding to the saturation pressure for the refrigerant 37 for the temperature to which the refrigerant is being cooled by the cooling, or deep ocean, water. In this example, if the effective temperature in the evaporator 36 were to be 83° F., the pressure in the evaporator 36 portion of the system would be 161 psia, and if the effective temperature in the condenser 70 were to be 50° F., the pressure in the condenser 70 portion of the system would be 89.19 psia, thus creating a pressure differential of 71.81 psi across the prime mover 72. The prime mover 72 is driven by this pressure differential and the mass flow of refrigerant vapors from the evaporator 36 to the condenser 70 would be a function of the volumetric displacement of the prime mover 72. The electrical generator 74, driven by the prime mover 72, then provides the energy to operate the apparatus. The condensed refrigerant vapors, liquid, in the condenser 70, are returned to the evaporator 36 by means of pump 56, which draws the refrigerant 37 from the condenser 70 through conduit 60 and pumps this refrigerant 37 to the divert valve 52. The liquid level control 42 controls the level of the refrigerant 37 in the evaporator 36 by operating the divert valve 51, allowing refrigerant 37 to flow from the divert valve 52 to the evaporator 36 through conduit 38 when the level of the refrigerant 37 in the evaporator 36 is less than the desired level and diverting the refrigerant 37 flow back into the condenser 70 through the conduit 54 when the level of the refrigerant 37 in the evaporator 36 is satisfactory. The control 50 senses the speed of the prime mover 72 and controls the controllable valve 46 to maintain the speed of the prime mover 72 constant, compensating for variations in loads on the electrical generator 74.

The apparatus 10 has thus been described, consisting of a first heat pump and a second heat pump, each of which can be used in other apparatus and for other applications as their functions dictate, which together in series comprise a heat pump method of producing mechanical power and electrical power, whereby the temperature differentials of two fluid sources, such as exist in ocean waters, is the only energy required to power the said apparatus and provide excess power and/or electrical power for external usage.

Figure 2:
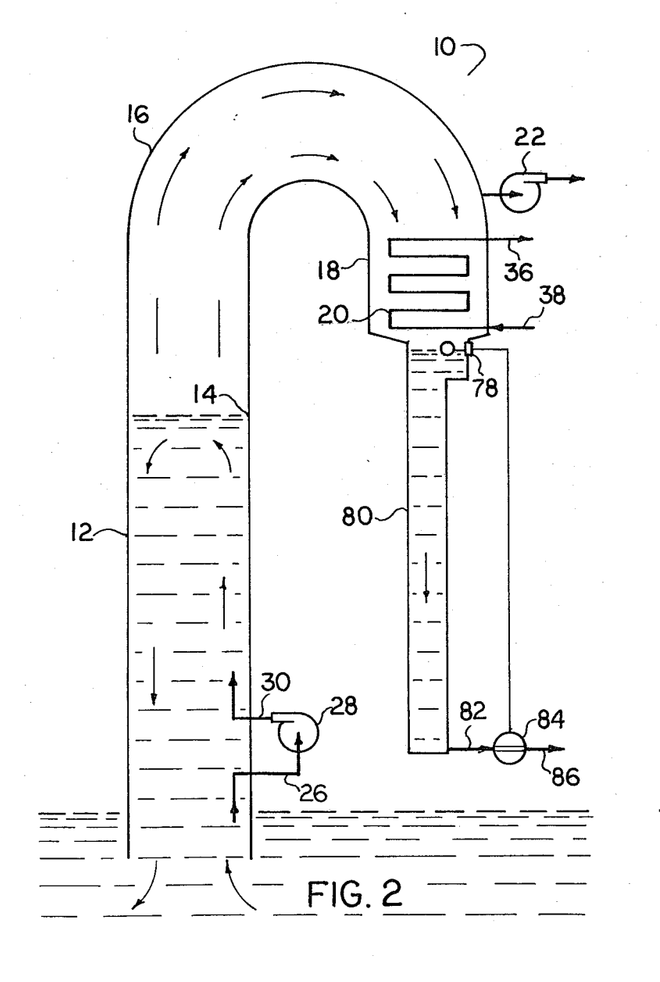
FIG. 2 is a diagram of the first heat pump system wherein an alternate method of removing condensate water from the apparatus is illustrated.

Now referring to FIG. 2 of the drawings, a method is illustrated whereby the condensate water in the first heat pump system, which is a result of the evaporation and condensing process and therefore distilled, or desalinated, water, can be removed from the system without being returned to the water source by means of the barometric conduit 24 connected to the water source. A different barometric conduit 80 is connected to the condenser 18 and is of such height as water in this barometric conduit 80 will create a head pressure equal to the difference between the atmospheric pressure and the pressure in the condenser 18, plus an additional head sufficient to give the desired head pressure at the condensate water valve 84. A liquid level control 78 located at the top of the barometric conduit 80 controls the condensate water valve 84, which is connected to the barometric conduit 80 by a conduit 82, and allows the condensate water valve 84 to discharge condensate water through conduit 86, while maintaining the desired head in barometric conduit 80. The means have thus been provided to remove condensate water from the system while the system is under negative, or saturation, pressure.

Figure 3:
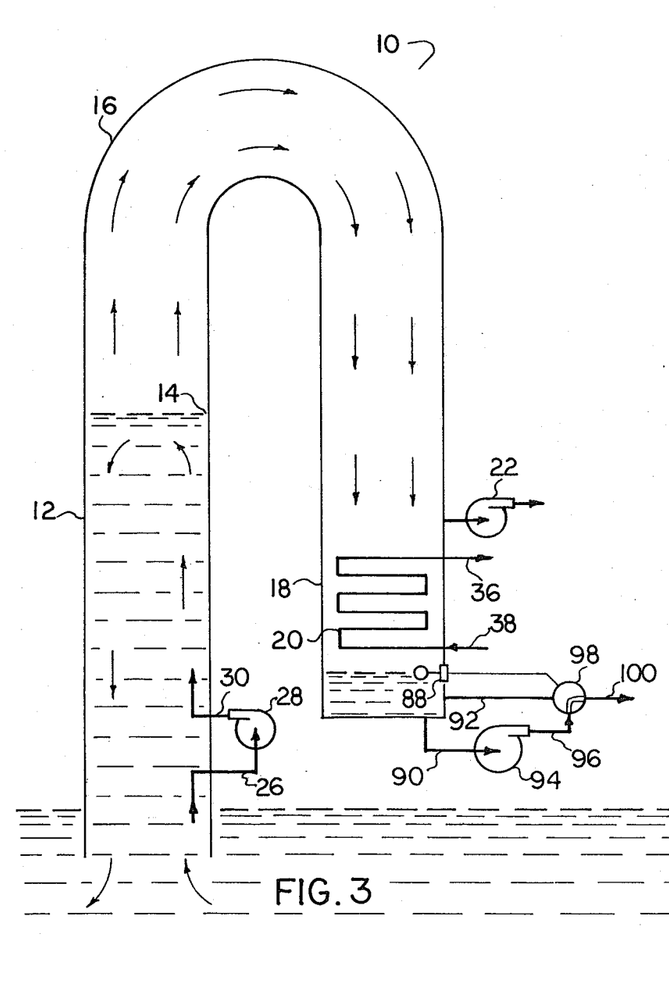
FIG. 3 is a diagram of the first heat pump system wherein another alternate method of removing condensate water from the apparatus is illustrated.

Now referring to FIG. 3 of the drawings, an alternate method is illustrated whereby the condensate water in the first heat pump system, which is a result of the evaporation and condensing process and therefore distilled, or desalinated, water, can be removed from the system without being returned to the water source, by conventional pump and valve means. A liquid level control designated by the numeral 88 is located in the bottom portion of the condenser 18 at the level at which it is desirable to maintain the level of the condensate water in the condenser 18. A condensate water pump designated by the numeral 94 is connected to the condenser 18 by means of a conduit designated by the numeral 90 and the outlet of the condensate water pump 94 is connected to a divert valve designated by the numeral 98 by means of a conduit designated by the numeral 96. A conduit designated by the numeral 92 connects the divert valve 98 with the condenser 18 and another conduit designated by the numeral 100 is connected to the divert valve 98 to remove the condensate water from the system. Condensate water from the condenser 18 collects in the bottom of the condenser 18 until this condensate water reaches the liquid level control 88, at which time the liquid level control 88 then regulates the action of the divert valve 98, letting condensate water out of the system sufficiently to maintain the condensate water level in the condenser 18, by alternately diverting the flow of condensate water out of the system through conduit 100, when the level of condensate water in the condenser 18 is above the desired level, and diverts the flow of condensate water back into the condenser 18 through conduit 92 when the level of condensate water in the condenser 18 is at or below the desired level. It can thus be seen that an alternate method of removing condensate water from the condenser 18, even though the system is at a pressure considerably lower than that of the atmospheric air outside of the closed system, has been described.

A heat pump method of producing mechanical power and electrical power, using a binary vapor cycle, has thus been described, whereby the temperature differentials present in the ocean, or any other warm and cold fluid sources, is the only energy required to power the said apparatus and provide excess power and/or electrical power for external usage.

The foregoing process and apparatus has a substantial savings over that of the prior art in that no conventional energy sources are required to operate the apparatus and the apparatus utilizes energy sources of low potential, low temperature differences, to effectively obtain significant power production.

The present disclosure includes that contained in the appended claims, as well as that of the foregoing description. Although this invention has been described in its preferred forms with a certain degree of particularity, it is understood that the present disclosure of the preferred forms has been made only by way of example and numerous changes in the details of construction and the combination and arrangement of parts may be resorted to without departing from the spirit and scope of the invention.

Having thus described the invention, I claim:

1. A heat pump system for producing electrical power, comprising in combination:
   a first and a second heat pump for a first and a second fluid, respectively;
   said first heat pump comprising a first evaporator and a first condenser interconnected by a first conduit;
   said second heat pump comprising a second evaporator and a second condenser interconnected by a second conduit;
   said first heat pump being independent from said second heat pump enabling said first and second heat pumps to operate without intermingling the first and second fluids;
   means for introducing warm first fluid into said first evaporator;
   a closed first heat exchanger disposed in said first condenser for absorbing heat from the condensing first fluid;

condenser return conduit means connecting said second condenser to said second evaporator and extending through said closed first heat exchanger for heating the condensed second fluid prior to introduction into said second evaporator;

a prime mover interposed in said second conduit for providing mechanical energy from the mass flow of vapor from said second evaporator to said second condenser;

an electrical generator coupled to said prime mover to convert said mechanical energy into an electrical power output; and electrical control means connected to said electrical generator for directing the electrical power output thereof to operate the heat pump system and for directing any excess electrical power output for external usage.

2. A heat pump system as set forth in claim 1, wherein the first fluid has different physical properties than the second fluid.

3. A heat pump system as set forth in claim 1, including a bypass conduit connected in parallel with said prime mover; and bypass control valve means interposed in said bypass conduit for controlling the flow of the second fluid around said prime mover for controlling the speed thereof.

4. A heat pump system as set forth in claim 1, wherein said first evaporator is connected by a first evaporator conduit to the warm first fluid; and said first evaporator conduit forming a barometric leg between the low internal pressure of said first evaporator and the ambient.

5. A heat pump system as set forth in claim 1, including a first condenser conduit for forming a barometric conduit to return the condensed first fluid to the ambient.

6. A heat pump system as set forth in claim 1, including a closed second heat exchanger disposed in said second condenser for condensing the second fluid.

7. A heat pump system as set forth in claim 6, including a second heat exchanger pump for circulating a cool fluid through said second heat exchanger.

8. A heat pump system for producing electrical power, comprising in combination:

a first and a second heat pump for a first and a second fluid, respectively;

said first heat pump comprising a first evaporator and a first condenser interconnected by a first conduit;

said second heat pump comprising a second evaporator and a second condenser interconnected by a second conduit;

means for introducing warm first fluid into said first evaporator;

a closed first heat exchanger disposed in said first condenser for absorbing heat from the condensing first fluid;

condenser return conduit means connecting said second condenser to said second evaporator and extending through said closed first heat exchanger for heating the condensed second fluid prior to introduction into said second evaporator;

a prime mover interposed in said second conduit for providing mechanical energy from the mass flow of vapor from said second evaporator to said second condenser;

an electrical generator coupled to said prime mover to convert said mechanical energy into an electrical power output;

electrical control means connected to said electrical generator for directing the electrical power output thereof to operate the heat pump system and for directing any excess electrical power output for external usage; and liquid level control means connected to said condenser return conduit means for maintaining a desired level of the second fluid in said second evaporator;

said condenser return conduit means forming a closed second heat pump;

a second condenser pump interposed in said condenser return conduit means for pumping the condensed second fluid through said first heat exchanger to said second evaporator.

9. A heat pump system for producing electrical power, comprising in combination:

a first and a second heat pump for a first and a second fluid, respectively;

said first heat pump comprising a first evaporator and a first condenser interconnected by a first conduit;

said second heat pump comprising a second evaporator and a second condenser interconnected by a second conduit;

means for introducing warm first fluid into said first evaporator;

a closed first heat exchanger disposed in said first condenser for absorbing heat from the condensing first fluid;

a first condenser pump interconnected to said first condenser for pumping the condensed first fluid from said first condenser;

condenser return conduit means connecting said second condenser to said second evaporator and extending through said closed first heat exchanger for heating the condensed second fluid prior to introduction into said second evaporator;

a prime mover interposed in said second conduit for providing mechanical energy from the mass flow of vapor from said second evaporator to said second condenser;

an electrical generator coupled to said prime mover to convert said mechanical energy into an electrical power output; and electrical control means connected to said electrical generator for directing the electrical power output thereof to operate the heat pump system and for directing any excess electrical power output for external usage.

10. A heat pump system as set forth in claim 9, including level control means connected to said first condenser pump for controlling the level of condensed first fluid in said first condenser.

11. A heat pump system for producing electrical power, comprising in combination:

a first and a second heat pump for a first and a second fluid, respectively;

said first heat pump comprising a first evaporator and a first condenser interconnected by a first conduit;

said second heat pump comprising a second evaporator and a second condenser interconnected by a second conduit;

means for introducing warm first fluid into said first evaporator;

a closed first heat exchanger disposed in said first condenser for absorbing heat from the condensing first fluid;

condenser return conduit means connecting said second condenser to said second evaporator and extending through said closed first heat exchanger for heating the condensed second fluid prior to introduction into said second evaporator;

a prime mover interposed in said second conduit for providing mechanical energy from the mass flow of vapor from said second evaporator to said second condenser;

an electrical generator coupled to said prime mover to convert said mechanical energy into an electrical power output;

electrical control means connected to said electrical generator for directing the electrical power output thereof to operate the heat pump system and for directing any excess electrical power output for external usage; and an evaporator return conduit for circulating the second fluid in said second evaporator through said closed first heat exchanger.

12. A heat pump system as set forth in claim 11, including a second evaporator pump interposed in said evaporator return conduit for circulating the second fluid through said closed first heat exchanger means back to said second evaporator.

* * * * *